Aug. 15, 1933.          F. W. LYLE          1,922,250
FREQUENCY CHANGING CIRCUIT
Filed Aug. 23, 1930

INVENTOR
Frederick W. Lyle
BY
ATTORNEY

Patented Aug. 15, 1933

1,922,250

UNITED STATES PATENT OFFICE 1,922,250

FREQUENCY-CHANGING CIRCUIT

Frederick W. Lyle, Wilkinsburg, Pa., assignor to Westinghouse Electric & Manufacturing Company, a Corporation of Pennsylvania Application August 23, 1930. Serial No. 477,353

11 Claims. (Cl. 172—281)

My invention relates to frequency-changing circuits and especially to such circuits as include a plurality of gaseous rectifiers.

An object of my invention is to provide a circuit for changing the alternating-current frequency from one value to another value, preferably, of a lower order.

More specifically, it is an object of my invention to provide a bank of gaseous rectifiers with automatic means for changing the potential on their grids for changing the frequency between the input and the output lines.

Figure 1:
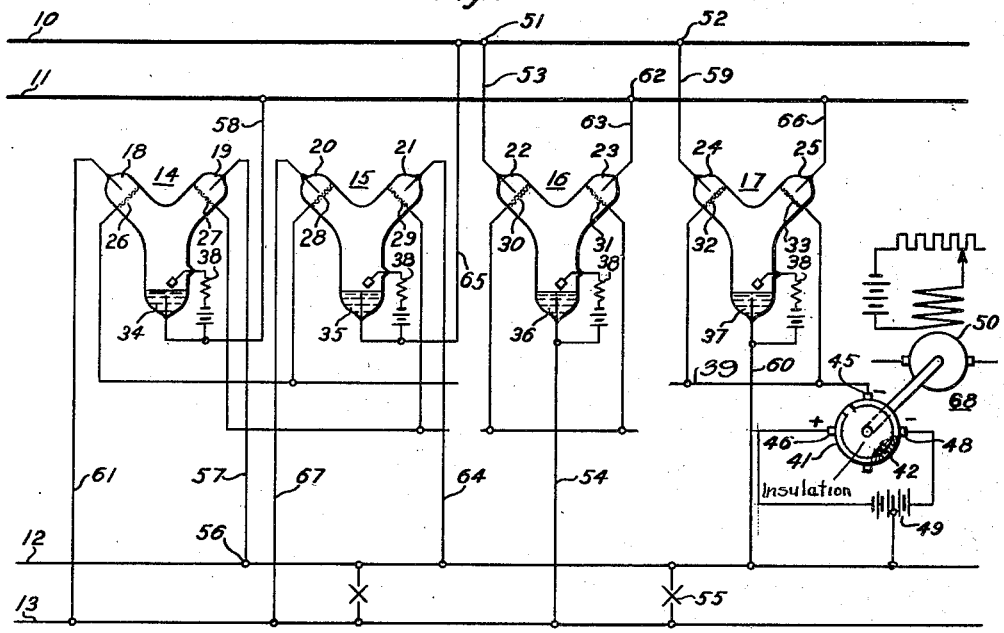

Other objects of my invention will become evident from the following detailed description, taken in conjunction with the accompanying drawing, in which Figure 1 is a diagrammatic view of a system organized in accordance with my invention.

Figure 2:
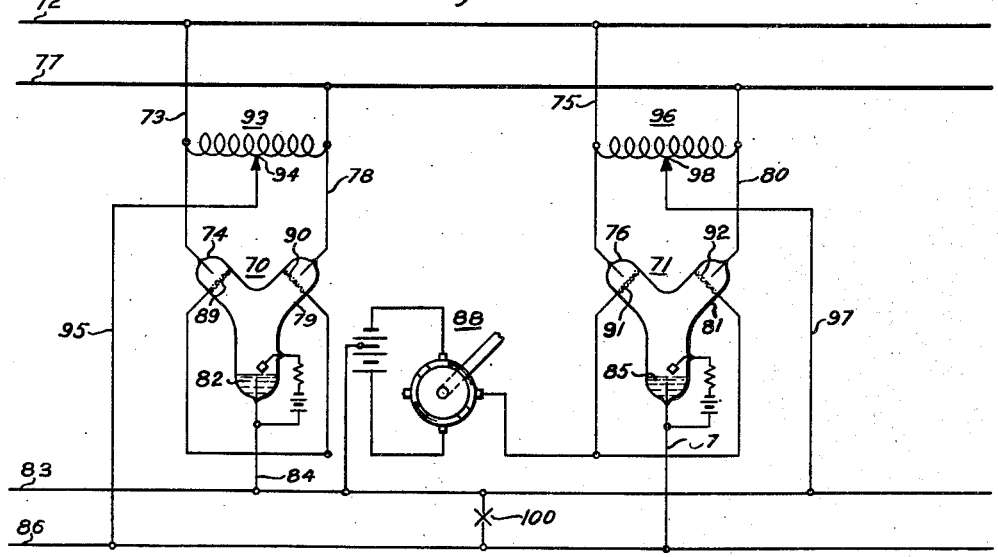

Fig. 2 is a diagrammatic view of a modification of the system of Fig. 1.

The system disclosed in Fig. 1 comprises the input lines 10 and 11 for feeding the output of load-circuit lines 12 and 13. A plurality of rectifiers 14, 15, 16 and 17 which, preferably, are of a type in which gaseous ions play a substantial part in current flow, are connected across the two lines. Each of the rectifiers has, preferably, the double anodes 18, 19, 20, 21, 22, 23, 24 and 25 disclosed in the drawing. Each of the rectifiers also has, preferably disposed therein adjacent to each anode, a grid which is represented by any of the numerals from 26 through 33, respectively, on the drawing. Each of the rectifiers, however, has only a single cathode, such as the mercury pool 34, 35, 36 or 37. A keep-alive circuit 38 is associated with each rectifier, as is well known in the art.

The grids of the rectifiers are connected to a plurality of polarity-changing devices, such as that illustrated at 68 on the right-hand side of Fig. 1. Grids 26 and 28 are connected to one device, 32 and 33 are connected to another polarity changing device 68 by a line 39, and the remaining grids 27, 29, 30 and 31 are connected in pairs respectively to devices similar to the polarity-changing device 68.

While this polarity-changing device 68 may be of any suitable design, a preferred type is disclosed in the drawing. The polarity changer may consist of a commutator 41 divided into two conducting segments. Between each two adjacent segments is preferably inserted a small insulating segment 42. Brushes 45, 46, 48 bear on the commutator 41 and are spaced 90° apart. Line 39 is connected to the brush 45. Brushes 46 and 48 are connected to opposite terminals of a source of direct-current potential, such as a battery 49, the neutral point of which is connected to the rectifier cathode. Any suitable motor 50 rotates the commutator 41.

Assuming that the line 10 of the input circuit is positive, the alternating current therefrom will pass from one of the connecting points 51 and 52 to the discharge tube or rectifier 16 or 17, depending upon the polarity of the grids 30 and 32. Assuming that the commutator ring is in such position that the direct-current source 49 sends a positive potential to the grid 30 along the connection 40, the current in line 10 will pass down the connection 53 to the anode 22 and will be conducted along the discharge path, inside the tube or rectifier 16, to the cathode 36. From the cathode 36, the current will pass, through the connection 54, to the line 13 and across the load 55 to the line 12. From the line 12, the current will pass from the connection 56, through the connection 57, to the anode 19 and will discharge, through the rectifier 14, to the cathode 34. From the cathode 34, the current will return, by connection 58, to the line 11 of the input circuit. The direction of the current, just described, is determined by the polarity of the grids because the current cannot pass from the wire 10 through the rectifier 17, because of the negative potential on the grid 32.

When the polarity of the input circuit reverses so that line 11 has a positive polarity, the current will continue to pass through the rectifier 16, since the grid 31 is positive in polarity, like grid 30. The current will pass from the connection 62, down the wire 63, to the anode 23 and along the discharge path of the rectifier 16, to the cathode 36. From the cathode 36, the current travels, through the connection 54, to the line 13 and, across the load 55, to the line 12. From line 12, it passes, through the connection 64, to the anode 21 and, along the discharge path of the rectifier 15, to the cathode 35. From the cathode 35, the current passes, through the connection 65, to the line 10.

In the course of its rotation, the commutator 41 removes the positive potential from grids 30 and 31. It is within the purpose of my invention that tubes 14 to 17 should be high-vacuum hot-cathode devices, and, in such case, current will change from passing down the wire 63 to passing down the connection 66 to the anode 25 of the rectifier 17. The grid 32 is now positive and the grid 30 is negative. The current will then pass, on the gaseous discharge conducting path, through the rectifier 17, from the anode 24 to the cathode 37. From the cathode 37, the current travels, by way of the connection 60, to the line 12 and, across the load 55, to the line 13. From the line 13, the current passes, up the connection 67, to the anode 20 and, along the discharge path of the tube 15, to the cathode 35. From the cathode 35, the current passes, through the connection 65, to the line 10.

Accordingly, the current will pass from one of the input lines to one of the output lines and across the load to the other output line and then will return to the other input line. Assuming a fixed period for the alternations of the current in the input lines 10 and 11, the period of alternations of the output lines 12 and 13 can be determined by the speed of the commutator 41. The frequency of the output lines 12 and 13 may be increased or decreased, as desired, from that of the input circuit 10 and 11. If the frequency of lines 10 and 11 is, for instance, of 60 cycles, the speed of the grid polarity changer 68 may be regulated to provide a 25-cycle across the load 55 or any other frequency desired.

However, for many purposes, it will be desirable for the tubes 14, 15, 16, 17 to be gaseous discharge devices. When a grid in a discharge tube is changed from positive to negative, the discharge often will not stop until the alternating voltage has passed through zero phase.

It is, therefore, desirable that the grids 32, 33 should not be given a positive potential until the voltage of lines 10, 11 has passed through zero, hence, the insulating segments 42 have been placed in the commutator ring. The widths of the insulating segments should be such that a time equal to at least a half period of the voltage 10, 11 will elapse between the removal of positive polarity from the brush 45 and the imposition of positive polarity on brush 46.

The modification of the circuits shown in Fig. 2 utilizes only two rectifiers 70 and 71 which may be of the types described in connection with Fig. 1. The input line 72 has a connection 73 to the anode 74 of the rectifier 70, and another connection 75 to the anode 76 of the rectifier 71. Likewise, the other input line 77 has a connection 78 to the anode 79 of the rectifier 70, and another connection 80 to the anode 81 of the rectifier 71. The cathode 82 of the rectifier 70 is connected to the output line 83 by a connection 84. The cathode 85 of the rectifier 71 is connected to the other output line 86 by a connection 87. A polarity-changing device 88, similar to device 68 of Fig. 1, changes the polarity of the grids 89, 90, 91 and 92 of the rectifiers as desired. The polarity of the grids 89 and 90 of rectifier 70 is opposite to that of the grids 91 and 92 of rectifier 71. An auto transformer 93 is placed across the connections 73 and 78 to extend from the two anodes of the rectifier 70 to oppposite sides of the input circuit. From the mid-point 94 of the transformer 93, a connection 95 extends to the output line 86.

Another auto transformer 96 extends across the connections 75 and 80 and has a connection 97 from its mid-point 98 to the output line 83.

If the grids 91 and 92 of the rectifier 71 are positive, and the line 72 is also positive, the current will pass, through the connection 75, to the anode 76, along the discharge path of the tube 71, to the cathode 85. From the cathode 85, the current will pass through the connection 87 to the output line 86 and across the load 100 to the other output line 83. From the line 83, it will pass through the connection 97 to the mid-point 98 of the auto transformer 96 and then through the right-hand side of the auto transformer to the connection 80 and thus to the other input line 77.

There will be an oscillatory circuit passing from the mid-point 98, through the left-hand side of the transformer 96, the anode 76, the connection 87, load 100 and connection 97, to the mid-point 98 of the transformer. Such an oscillatory circuit, however, will not disturb the passage of the current from one side of the input circuit through the load and back to the other side of the input circuit.

If the rectifiers 70 and 71 are of the high-vacuum type, and the gride potential-changing device 88 makes the grids 89 and 90 positive while the line 72 is still positive, the current will pass, through the connection 73, anode 74, cathode 82, connection 84, output line 83, load 100, output line 86, connection 95, mid-point 94, right-hand side of transformer 93 and connection 78, to the other input line 77. The oscillating circuit will include the left-hand side of the auto transformer 193.

If the polarity of line 77 becomes positive while grids 89 and 90 are positive, the current passes, through connection 78, anode 79, cathode 82, connection 84, output line 83, load 100, output line 86, connection 95, mid-point 94, left-hand side of transformer 93 and connection 73, to the other side of the input circuit 72. The oscillating circuit will include the right-hand side of the transformer 93.

If the grids 91 and 92 become positive while the line 77 is positive, the current will pass, through connection 80, anode 81, cathode 85, connection 87, output line 86, load 100, output line 83, connection 97, mid-point 98 of the transformer 96, left-hand side of transformer 96 and connection 75, to the line 72. The oscillating circuit will include the right-hand side of the auto transformer 96.

While an oscillatory circuit may exist in part of the circuit as previously described, these oscillations do not disturb the passage of current through the circuit, as the currents travel in the same direction over identical parts and branch off from each other through different parts of the transformer.

If the rectifiers 70 and 71 are of the gaseous-discharge type, the commutator of the polarity changer 88 should be arranged to permit at least one half-period of the voltage of lines 72, 77 to elapse between the removal of positive polarity from the grids of one tube and its imposition on the grids of the other tube, for the reasons pointed out in describing the apparatus shown in Fig. 1.

While energy flow may be from either of the lines of different frequency to the other, it is preferable that the line of higher frequency be that to which the anodes of tubes 70 and 71 in Fig. 2, and of tubes 16 and 17 of Fig. 1 are connected.

It is within contemplation of my invention that the commutators 41 of Fig. 1 and of 88 of Fig. 2 should be driven synchronously with, and from, one alternating-current line, and, in such case, they may be made to change the grid polarities only at zero value of the voltage wave of lines 10, 11 (or 72, 77), thereby making the interval between the removal of positive polarity from one set of grids and its imposition on the other set unnecessary, even when the rectifiers are gaseous-discharge devices. It will be recognized that the commutators are merely illustrative of many means of controlling the grid potentials which are well known in the electrical arts.

Accordingly, I have described a circuit for changing the alternating frequency between input and output lines to any value desired. I do not wish to be restricted to the specific structural details, arrangement of parts or circuit connections herein set forth, as various other modifications thereof may be effected without departing from the spirit and scope of my invention. I desire, therefore, that only such limitations shall be imposed as is necessitated by the prior art and by the spirit of the appended claims.

I claim as my invention:

1. A device for changing the alternating frequency between input and output lines which comprises two or more gaseous rectifiers across said lines, grids in said rectifiers and means for making the potential on the grids of one rectifier positive at intervals, and the grids of the other rectifier positive in intervening intervals, separated from said first intervals by at least a half-period of the greater of said alternating frequencies.

2. A device for changing the alternating frequency between input and output lines which comprises two or more gaseous rectifiers across said lines, a cathode, a grid and a plurality of anodes in each said rectifier and means for periodically imposing such a potential on each said grid relative to its cathode as to render the rectifier containing it conductive, a time interval at least equal to a half period of said line frequency intervening between the removal of said potential from the grid of one rectifier and imposition of each potential on the grid of another.

3. A circuit for changing the frequency of alternating currents comprising alternating-current input lines, alternating-current output lines, and a plurality of gaseous discharge devices severally having a cathode, a plurality of anodes and a plurality of grids, some of said anodes being connected to said input lines and some of said anodes being connected to said output lines, one or more of said cathodes being connected to said input lines and one or more of said cathodes being connected to said output lines and means for applying a changing potential to said grids.

4. A circuit for changing the frequency of alternating currents comprising two input lines, two output lines and a plurality of rectifiers, each of said rectifiers having a cathode, with control electrodes therefor, and two anodes, two of said rectifiers severally having an anode connected to each input line, and the cathode of one of said two rectifiers being connected to one of the input lines and the cathode of the other rectifier being connected to the other output line, and two other rectifiers having their anodes connected to each of said output lines and the cathode of one rectifier being connected to one of said input lines and the cathode of the other rectifier being connected to the other input line.

5. A circuit for changing the frequency of alternating currents comprising two input lines, two output lines, two gaseous rectifiers connected between said input and said output lines, said rectifiers severally having two anodes and one cathode, the anodes of said rectifiers being connected to each of said input lines, the cathode of one rectifier being connected to one output line, the cathode of the other rectifier being connected to the other output line, an auto transformer connected across the anodes of each rectifier, and a connection from the mid-point of each of said auto transformers to one of said output lines.

6. Alternating-current input lines, alternating-current output lines and means connecting said lines for making the alternating frequency of said output lines of different value from that of said input lines including a bank of gaseous discharge devices having an even number of current paths, with control means for each path constituting two groups, and means for causing said control means groups to permit current flow respectively in alternate time intervals separated by times equal to half periods of one of said alternating current lines.

7. An electrical distribution system comprising an alternating current system, a system comprising a plurality of line-conductors, a rectifier energized by said alternating current system for each line-conductor of the system last mentioned and having its output connected thereto, and control means adapted to render said rectifiers conductive successively.

8. An electrical distribution system comprising an alternating current system, a system comprising a plurality of line-conductors, a gaseous discharge rectifier energized by said alternating current system for each said line-conductor and having its output connected thereto, and control means adapted to act to render said rectifiers conductive successively and with times equal to one-half cycle of said alternating current intervening between said acts.

9. An electrical distribution system comprising an alternating current system, a system comprising a plurality of line-conductors, a gaseous discharge rectifier energized by said alternating current system for each said line-conductor and having its output connected to transmit power from said alternating current system to said line conductor, and control means adapted to act to render said rectifiers conductive successively and with times equal to one-half cycle of said alternating current intervening between said acts.

10. An electrical distribution system comprising an alternating current system, a system comprising a plurality of line-conductors, a gaseous discharge rectifier energized by said alternating current system for each said line conductor and connected to transmit power from said alternating current system to said line conductor, and control means adapted to act to render said rectifiers conductive successively with a periodicity independent of that of said alternating current system.

11. An electrical distribution system comprising an alternating current system, a system comprising a plurality of line-conductors, a gaseous discharge rectifier energized by said alternating current system for each said line conductor and connected to transmit power from said alternating current system to said line conductor, and control means adapted to act to render said rectifiers conductive successively with a periodicity independent of that of said alternating current system and with times equal to one-half cycle of certain alternating current intervening between said acts.

FREDERICK W. LYLE.